(12) United States Patent
Rinne et al.

(10) Patent No.: US 6,311,987 B1
(45) Date of Patent: Nov. 6, 2001

(54) HYDRAULIC PRESSURIZING ARRANGEMENTS

(75) Inventors: Erkki Rinne, Kirkkonuommi; Lauri Toikka, Kauniainen, both of (FI)

(73) Assignee: Unicraft Oy, Helsinki (FI)

( * ) Notice: Subject to any disclaimer, the term of this patent is extended or adjusted under 35 U.S.C. 154(b) by 0 days.

(21) Appl. No.: 09/380,542

(22) PCT Filed: Mar. 5, 1998

(86) PCT No.: PCT/FI98/00199

§ 371 Date: Dec. 3, 1999

§ 102(e) Date: Dec. 3, 1999

(87) PCT Pub. No.: WO98/39123

PCT Pub. Date: Sep. 11, 1998

(30) Foreign Application Priority Data

Mar. 6, 1997 (DE) .......................... 297 04 245 U

(51) Int. Cl.⁷ ....................................... B23B 31/30
(52) U.S. Cl. .................. 279/4.03; 279/2.08; 403/31; 409/234
(58) Field of Search ................. 279/2.07, 2.08, 279/4.03, 4.11, 71, 75, 904, 905; 403/31, 15; 409/234

(56) References Cited

U.S. PATENT DOCUMENTS

| | | | |
|---|---|---|---|
| 2,826,420 | * 3/1958 | Klingler | 279/4.03 |
| 2,911,222 | * 11/1959 | Eve | 279/4.09 |
| 5,018,916 | 5/1991 | Bauch et al. | 409/233 |
| 5,052,866 | 10/1991 | Bauch et al. | 409/233 |
| 5,435,577 | 7/1995 | Bauer et al. | 279/4.01 |
| 5,944,325 | * 8/1999 | Schmeisl | 279/4.03 |

FOREIGN PATENT DOCUMENTS

| | | | |
|---|---|---|---|
| 465219 | * 5/1950 | (CA) | 279/4.03 |
| 4106504 | 4/1992 | (DE) . | |
| 4232282 | 3/1994 | (DE) . | |
| 93527 | 8/1994 | (FI) . | |

* cited by examiner

Primary Examiner—Steven C. Bishop
(74) Attorney, Agent, or Firm—Birch, Stewart, Kolasch & Birch, LLP

(57) ABSTRACT

An arrangement for a hydraulically operated tool holder has a pressurizing system for operating a clamping device for a tool or workpiece. The pressurizing system comprises a movable operating element for pressure generation whereby the movement of the operating element causes a movement of a guideway which has an inclined or end or bend surface with respect to its direction of movement. The guideway coacts with the actuator rolling or sliding at the surface thereof whereby the movement resulting from the movement of the guideway is transmitted to at least one pressure transfer piston in a pressure cylinder. The pressure transfer piston comprises at least one support part for the actuator and a lip seal and coacts with the clamping device.

12 Claims, 5 Drawing Sheets

HYDRAULIC PRESSURIZING ARRANGEMENTS

This application is the national phase under 35 U.S.C. §371 of PCT International Application No. PCT/SE98/00199 which has an International filing date of Mar. 5, 1998 which designated the United States of America.

BACKGROUND OF THE INVENTION

1. Field of the Invention

The present invention relates to hydraulic pressure arrangements.

2. Description of the Related Art

A variety of spindle mounted balancers have been designed over the years having the meaning to simplify and improve the accuracy of manual balancing methods. Attention shall be given to those designed to operate while the spindle is revolving. Such balancers, generally known as unbalance compensators, can be broadly classified into two categories; mechanical and fluid operated. The mechanical types cannot, however, do both large and fine balance corrections at the same time. Such balancing arrangements have been illustrated for example in U.S. Pat. No. 2,518,226 (Drake), U.S. Pat. No. 4,683,681 (Russ) and the PCT publication number WO82/00353.

Also the following publications present structures belonging to this technological field. The U.S. patent publications 5,174,585 (Rinne), 2,324,225 (Mueller), 2,553,990 (Vidal), 2,652,749 (Hagmeister), 2,794,661 (Sears), 2,826,420 (Klinger), 2,852,287 (Baker), 2,911,222 (Eve), 3,259,020 (Walker), 4,430,017 (Stefanicich) and the UK patent publication 2007550 disclose fastening means for axial bodies based on the idea of using hydraulic pressure in a closed cylindrical space to deform a fastening sleeve and to clamp a tool accurately with high torque.

Releasable hydraulic chucks are widely used to clamp tools and workpieces. However, these clamping means involve problem of oil leaks and they require big size which is causing weight and therefore unbalances.

SUMMARY OF THE INVENTION

An object of the present invention is to avoid the drawbacks of the known technology and to provide a well balanced toolholder whereby its own design is so well balanced that only the additional unbalance of the tool or workpiece to be clamped need to be balanced. The object mentioned above includes quickly operable pressurizing means and an unleakable piston and seal arrangement for a clamping device, whereby said problems can be eliminated.

A guide surface which is inclined or bent with respect to the moving direction is moved via an actuating element, particularly designed as a ring. On this guiding surface an actuator is sliding which in turn moves a pressure transfer piston which is movable in a pressure cylinder to a clamping means. The actuator is advantageously a ball, which rolls on the guiding surface. In the pressure transfer piston the actuator is supported by means of a support element, particularly made of a slippery PTFE-material which is able to creep under pressure. The pressure transfer piston further comprises a sealing to maintain the pressure applied by the actuator in the pressure cylinder.

By the help of the present invention a new and improved design and way to use a piston and seal arrangement for a clamping device can be achieved. As an advantage the invention provides a fast way to clamp a toolholder or the like. Further the device is light weight, accurate, symmetrical and has automatic balancing properties.

As the pressurizing ring of the toolholder is floating on the pressurized bearing balls the ring can find the best balance position for itself when the spindle is turning with high speed and still at the same time the ring is functioning as a pressurizing device of the clamping tool. The balancing ability is, of course, depending on the weight of the ring and the gap between the body and the ring which defines possible movement of the ring.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The invention is described in detail on the following pages by the help of the enclosed drawings which are given by way of illustration only, and thus are not limitative of the present invention, and in which.

DESCRIPTION OF THE PREFERRED EMBODIMENTS

Figure 1:
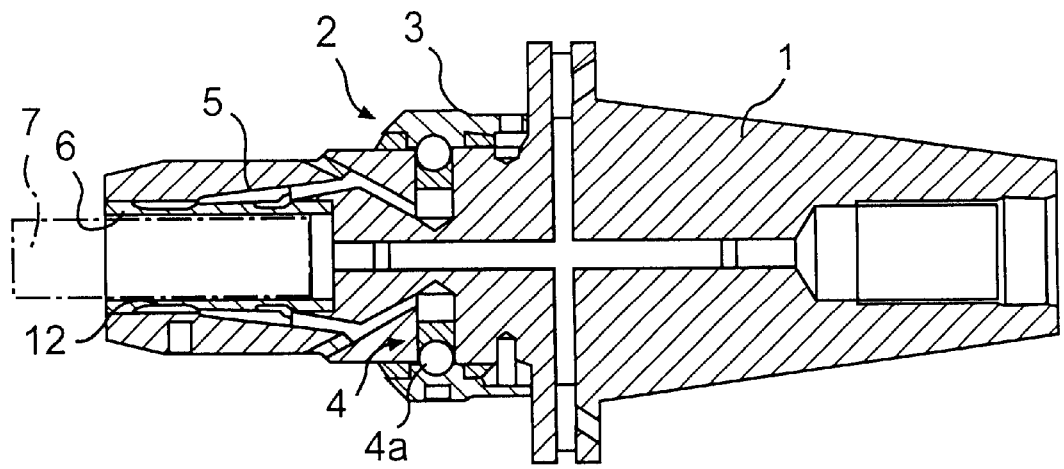
FIG. 1 shows a sectional side view of the present invention.

FIG. 1 shows a sectional side view of a toolholder having a body section 1 connected to a fastening device 2, the latter comprising a turnable pressurizing ring 3 which has on its inner circumference for instance three low angle eccentric surfaces 11. The pressurizing ring 3 fits on its smallest diameter accurately onto the body section 1. Further the pressurizing ring 3 has more than one, preferably three pistons 4, each of the pistons comprising a bearing ball 4a rolling along the corresponding eccentric surface 11 of the pressurizing ring 3 when the ring is rotated and thus working as power intensifier of the hydraulic pressure.

The fastening device 2 comprises further an axial bore 12 for a tool or a workpiece 7 to be fastened, the bore 12 being coaxial with the toolholder. The bore is surrounded by pressure channels 5 filled with pressure medium and connected with the pressure side of the pistons 4 of the pressurizing ring 3. Between the pressure channels 5 and the bore 12 there is a tubular steel sleeve 6 which is fixedly connected to the body of the toolholder. The sleeve 6 can be deformed by the pressure caused by the turning of the pressurizing ring 3 and conducted to the sleeve by the pressure medium in the pressure channels. When deforming the sleeve presses towards the bore 12 thus decreasing the diameter of the bore causing the tool or workpiece 7 inside the bore to be securely fastened.

Figure 2:
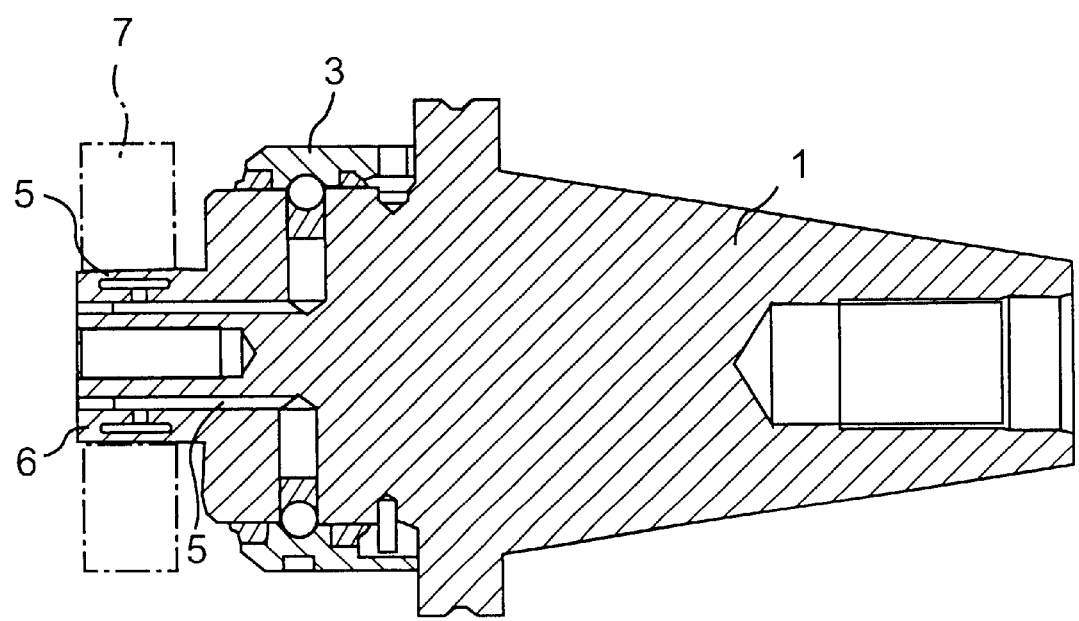
FIG. 2 shows a sectional side view of an embodiment of the present invention.

FIG. 2 shows another type of a toolholder. The fastening system is basically the same as in FIG. 1. However, in this type the tool or workpiece 7 is not inserted inside the bore but onto the cylindrical projection of the fastening device 2 which cylindrical projection is coaxial with the toolholder. The pressure in channels 5 presses the steel sleeve around the cylindrical projection now outwards and the sleeve expands thus fastening the tool or workpiece 7 securely onto the cylindrical projection when the pressurizing ring 3 is turned to the fastening position. The angle of rotation from loose position to fastened position can be between 60° to 180°, for example 90°.

Figure 3:
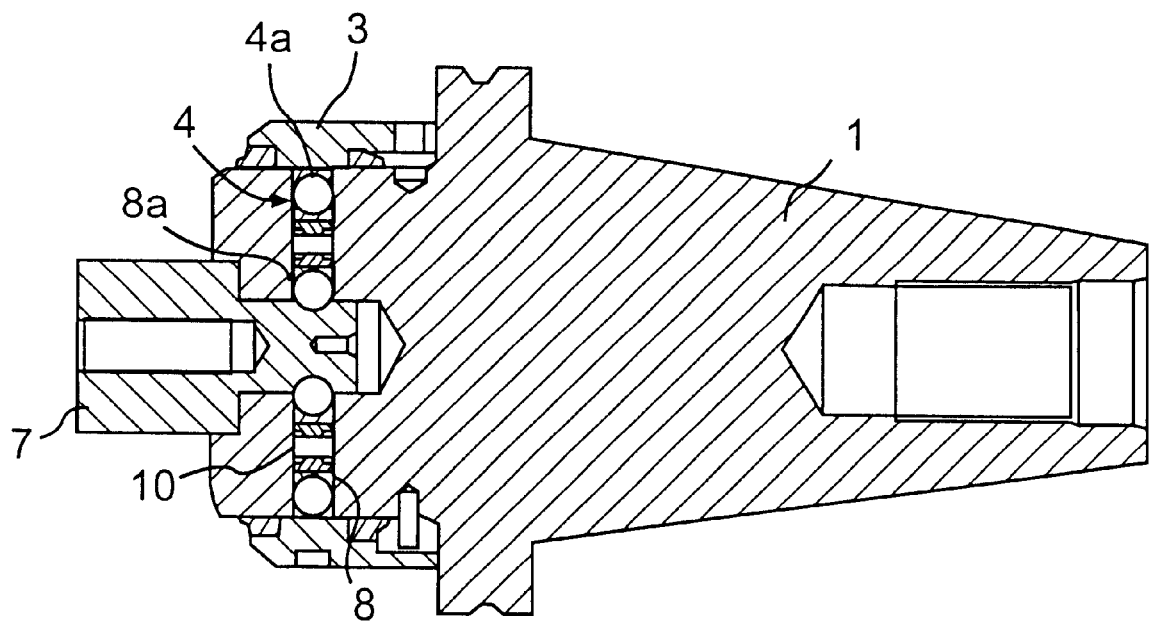
FIG. 3 shows a sectional side view of further another enbodiment of the present invention having a different tool fastening system.
Figure 4:
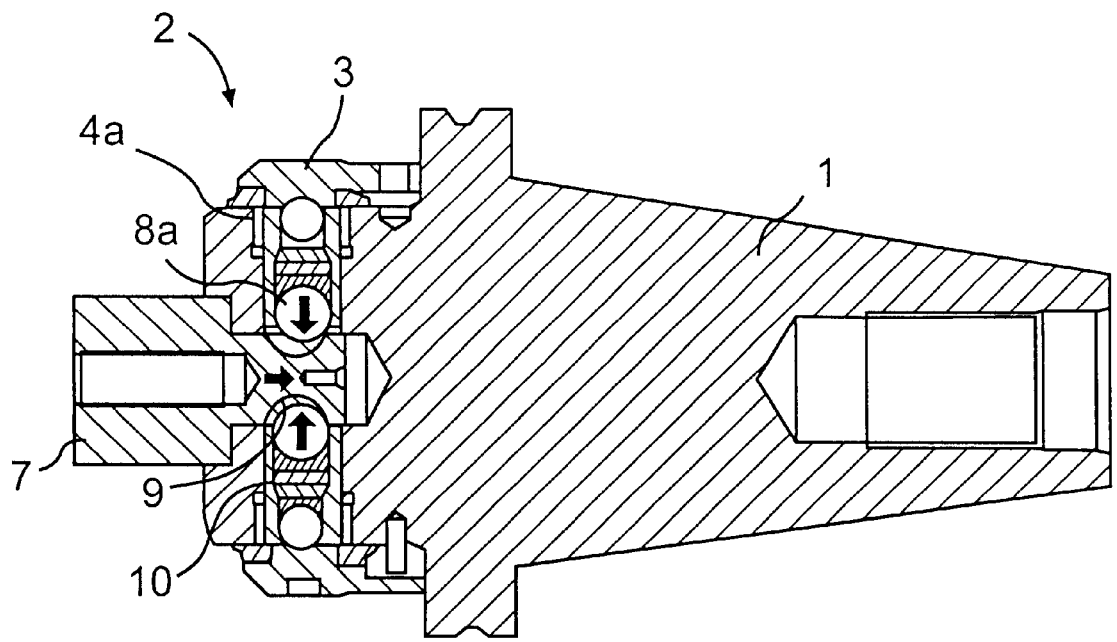
FIG. 4 shows a sectional side view of further another embodiment of the present invention having a booster for a tool fastening system.
Figure 5:
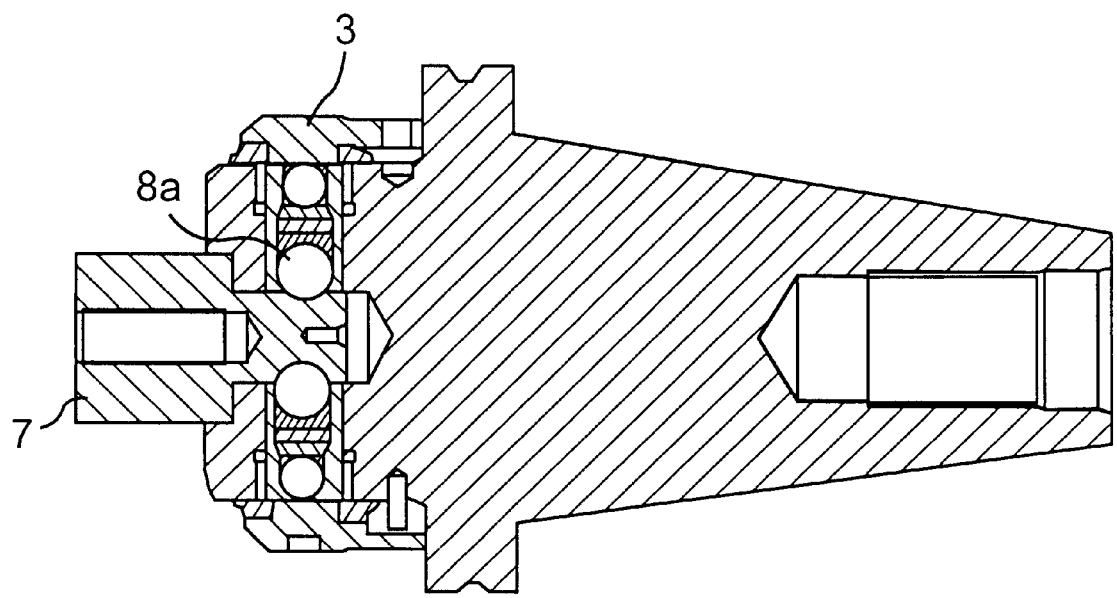
FIG. 5 shows a sectional side view of the embodiment of FIG. 4 where the clamped piece is locked.

FIGS. 3–5 show further another type of a toolholder. The tool or workpiece 7 is now form locked to its position when the pressurizing ring 3 is turned to the fastening position. Form locking is applied with hydraulically operated pistons B comprising bearing balls 8a which are moved by the pressure caused by the pistons 4 and which bearing balls 8a press towards the matching semi-circular groove 9 encircling the tubular locking projection of the tool or the workpiece. The groove 9 is better seen in FIG. 4 where the locking process is just beginning and the bearing balls 8a have not yet pressed completely into the bottom of the groove 9. Small arrows in FIG. 4 show the directions of the motions of the tool or the workpiece and the bearing balls 8a when turning the pressurizing ring 3 to the fastening direction. The pressure medium 10 conveys the pressure from the pistons 4 to the bearing balls 8a.

FIGS. 4 and 5 show a special embodiment of the invention where the diameter of the bearing ball 8a is bigger than that of bearing ball 4a. In this structure the piston system acts as a pressure booster or amplifier for the clamping device causing bigger pressure for locking the tool or the workpiece.

Figure 6:
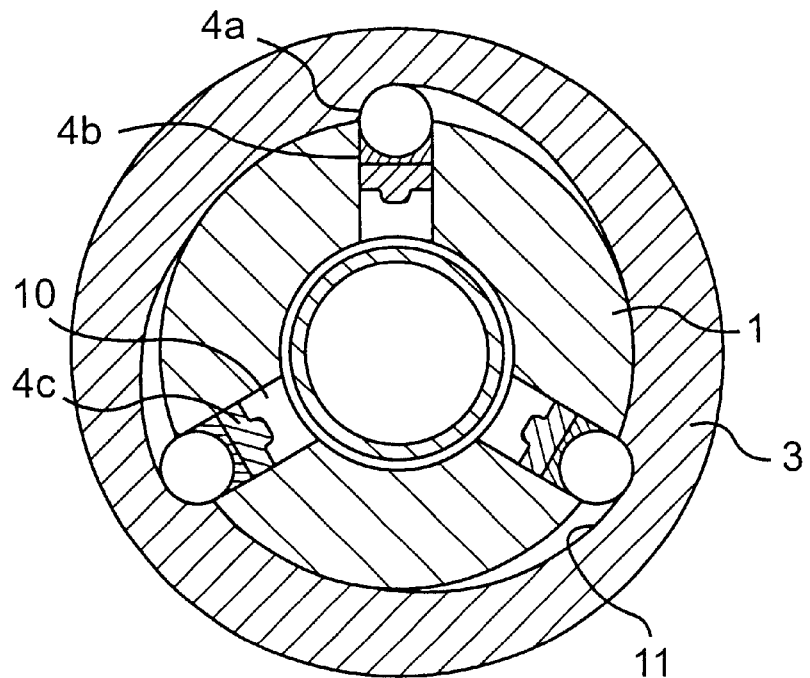
FIG. 6 shows a cross sectional view of the present invention, whereby the hydraulic bearing ball piston and seal arrangement are shown.
Figure 7:
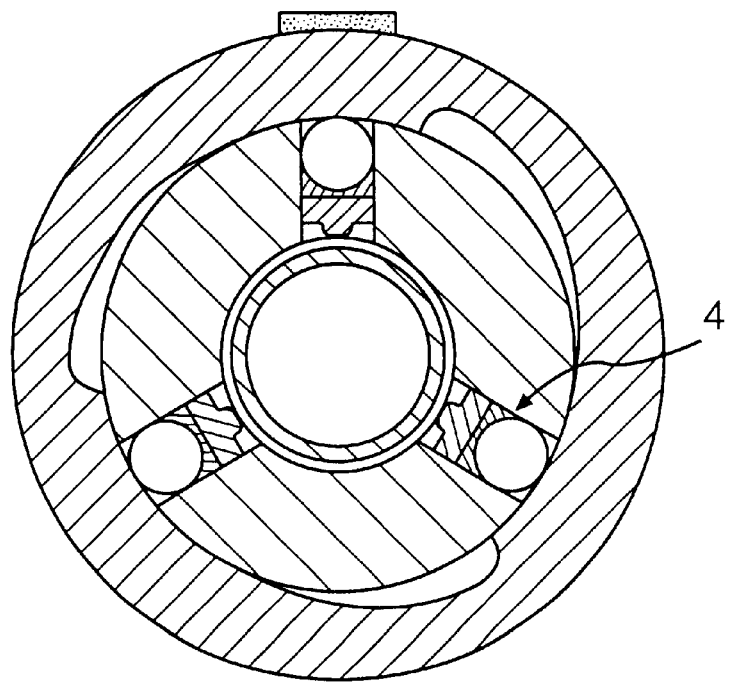
FIG. 7 shows a cross sectional view of the present invention, whereby several hydraulic pistons are pushed in by the eccentric ring and fastening the tool with hydraulic pressure.

FIGS. 6 and 7 present a cross sectional view of the invention, where the hydraulic bearing ball piston and seal arrangement are shown. In FIG. 6 the bearing balls 4a are further out in the eccentric surfaces 11 and thus the tool or workpiece is not fastened into its position. The system has its minimum pressure on. Piston 4 comprises the bearing ball 4a supported by a slippery supporting part 4b against which the bearing ball 4a is rolling when the pressurizing ring 3 is turned. The supporting part 4b consists of e.g. PTFE plastic or another similar slippery material. In order to achieve sufficient sealing in the piston bore the piston 4 is further equipped with a lip seal 4c which is situated on the pressure side of the piston arrangement 4 adjacent to the supporting part 4b.

When turning the pressurizing ring 3 to the position of FIG. 7, for instance 60°–180° (depending from the design) manually or with some known mechanical device the eccentric surfaces 11 press the bearing balls 4a in the piston bore towards the central axis thus causing a required hydraulic pressure to achieve the deformation of the steel sleeve 6 or the necessary locking power to clamp the tool or workpiece 7.

When the soft PTFE supporting parts 4b and 8b are used under the bearing balls 4a and 8a the PTFE supporting parts compensate their own wearing as they form and tend to creep against the bearing balls under a very high pressure. Thanks to the self compensating wearing property of the PTFE supporting parts the working pressure remain constant throughout the whole active working life of the toolholder.

Figure 8:
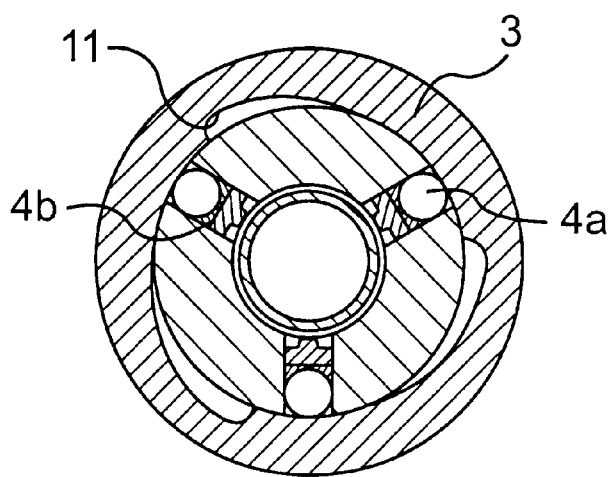
FIG. 8 shows an exaggerated illustration of the balancing situation of the ring, and FIG. 9 a further embodiment of the invention with axially inclined surfaces.

FIG. 8 shows an exaggerated illustration of the balancing situation of the pressurizing ring 3. When rotating with a high speed the pressurizing ring balances the toolholder by moving to its best balanced position and thus working as an automatic balancing device at the same time as causing the necessary fastening pressure to the tool or the workpiece 7. When rotating with a high speed the pressurizing ring 3 is floating in a balanced position on the bearing balls 4a. The movement to the best balanced position happens in the radial direction of the pressurizing ring 3.

When having two piston systems 4 and 8 they both comprises basically similar parts. They both are situated in the same piston bore so that the bearing balls 4a and 8a are further apart from each other thus each situating at its own end of the piston bore. Adjacent to the bearing ball 4a and 8a to inwards direction there are slippery supporting parts 4b and 8b and between the both supporting parts there is hydraulic pressure medium 10.

It is, of course, possible to design various combinations with slight modifications for diverse purposes without departing from the spirit and scope of the protection of the enclosed claims. For example the number of pistons 4 and 8 can vary depending on the embodiment. Also the connection of the pressurizing ring 3 with the body of the toolholder can be different from the structures shown in this description.

Figure 9:
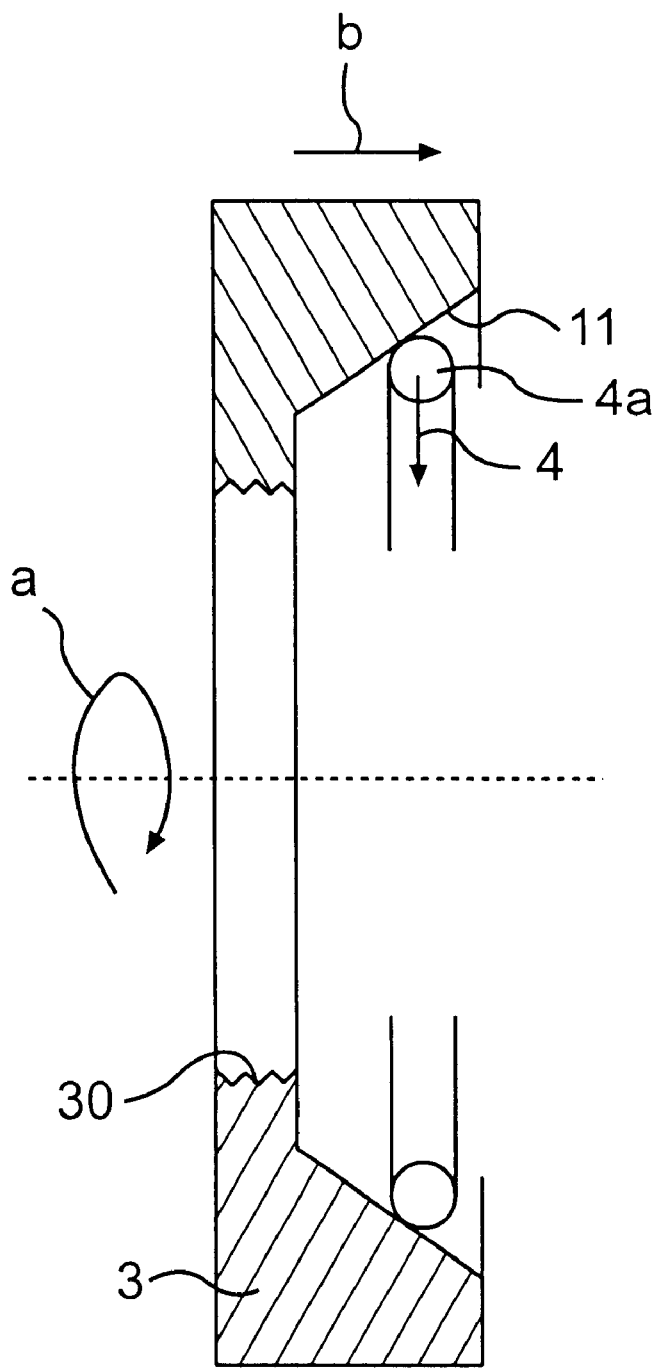

In the embodiment of FIG. 9 the turnable ring 3 is supported at the toolholder (not shown) by means of axial threads 30. A rotation of the ring in direction a is transformed by the threads in an axial movement according to arrow b. The guiding surface at the inner diameter of ring 3 is designed as axial cone with axially inclined guiding surfaces, whereon the balls 4a or other actuators of the pressure transfer pistons are sliding when the clamping means is operated.

The above illustrated invention in form of a hydraulically operated clamping means and arrangement for applying pressure to a piston sealing system is designed for an axially shaped cylindrical or spherical tool or workpiece or machine part of a desired shape. The device comprises a closed hydraulically operated system in a body part 1 and an eccentric clamping or pressurizing ring 3 located in the body part. This eccentric pressurizing ring 3 actuates bearing balls and associated pressure transferring pistons for applying pressure to a pressure channel 5 of a hydraulically operated device. This device may be a hydraulically operated toll holder, a clutch, a chuck or similar clamping means. This device is designed for clamping and releasing machine parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement for a hydraulically operated tool holder having a pressurizing system for operating a clamping device for a tool or workpiece comprising:

a movable operating element for pressure generation for the pressurizing system whereby rotational movement of the operating element causes rotational movement of at least one guideway, the guideway having at least one of an inclined and curved surface; and an actuator movable along the guideway, the actuator rolling or sliding on the surface of the at least one guideway whereby movement resulting from the movement of the guideway is transmitted to at least one pressure transfer piston in a pressure cylinder, and that the pressure transfer piston comprises at least one support part for the actuator and a lip seal and the pressure transfer piston coacts with the clamping device.

2. The arrangement according to claim 1, wherein the actuator is a ball which rolls on the surface of the guideway.

3. The arrangement according to claim 1, wherein the operating element is a ring which is located axially movable or rotatable at an outer circumference of the tool holder.

4. The arrangement according to claim 1, wherein the support part for the actuator is made of a slidable PTFE material with a high-creeping capacity.

5. The arrangement according to claim 1, wherein the guideway is provided directly at the operating element whereby the pressure transfer pistons are pushable via the actuator in a direction of pressure channels of a clamping device.

6. The arrangement according to claim 1, wherein the pressure transfer piston in the pressure cylinder actuates another hydraulically operated piston arrangement coacting with the clamping device for providing a pressure booster for the claiming device.

7. The arrangement according to claim 6, wherein a diameter of the other piston arrangement is larger than a diameter of the pressure transfer piston.

8. The arrangement according to claim 3, wherein the guideway comprises several surfaces located on the inner circumference of the ring and that three or more pressure transfer pistons are movable by the surfaces of the guideway, which ring slides on the actuators under hydraulic pressure so as to provide an automatic balancing device when the tool clamped to the tool holder is rotating at a high speed.

9. The arrangement according to claim 8, wherein the surface of the guideway extends in a direction of a circumference with an angle deviation of between 5 and 30°.

10. The arrangement according to claim 1, wherein the clamping device is a clamping bush which is deformable by the pressure transfer piston.

11. The arrangement according to claim 1, wherein the clamping device comprises clamping balls which are pushable by the pressure transfer piston into a surrounding groove of the tool or workpiece.

12. The arrangement according to claim 1, wherein the operating element encircles the at least one guideway.

* * * * *